United States Patent
Shi et al.

(10) Patent No.: US 12,462,426 B2
(45) Date of Patent: Nov. 4, 2025

(54) CAMERA REGISTRATION VIA ROBOT

(71) Applicant: Intel Corporation, Santa Clara, CA (US)

(72) Inventors: Xuesong Shi, Beijing (CN); Yujie Wang, Beijing (CN); Zhigang Wang, Beijing (CN); Peng Wang, Beijing (CN); Robert Watts, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 18/254,182

(22) PCT Filed: Dec. 25, 2020

(86) PCT No.: PCT/CN2020/139588
§ 371 (c)(1),
(2) Date: May 24, 2023

(87) PCT Pub. No.: WO2022/134060
PCT Pub. Date: Jun. 30, 2022

(65) Prior Publication Data
US 2024/0095957 A1 Mar. 21, 2024

(51) Int. Cl.
*G06T 7/80* (2017.01)
*G06T 7/33* (2017.01)
*G06T 7/73* (2017.01)

(52) U.S. Cl.
CPC .............. *G06T 7/80* (2017.01); *G06T 7/33* (2017.01); *G06T 7/73* (2017.01); *G06T 2207/30208* (2013.01); *G06T 2207/30232* (2013.01)

(58) Field of Classification Search
CPC .... G06T 7/80; G06T 7/33; G06T 7/73; G06T 2207/30232; G06T 2207/30208; G06T 2207/20072
See application file for complete search history.

(56) References Cited

U.S. PATENT DOCUMENTS 11,199,614 B1 * 12/2021 Gan ................. G01S 17/42
11,348,277 B2 * 5/2022 Thong ................ G06T 7/73
(Continued)

FOREIGN PATENT DOCUMENTS

| CN | 110345944 A | 10/2019 |
| CN | 110370286 A | 10/2019 |

(Continued)

OTHER PUBLICATIONS

International Search Report issued for the corresponding international patent application No. PCT/CN2020/139588, dated Sep. 27, 2021, 7 pages (for informational purposes only).
(Continued)

*Primary Examiner* — Wade Miles
*Assistant Examiner* — Zachary Joseph Wallace
(74) *Attorney, Agent, or Firm* — VIERING, JENTSCHURA & PARTNER mbB (57) ABSTRACT

The disclosure provides techniques for registering a camera into a map via a robot. A method for registering a camera into a map may include: collecting an observation of a calibration marker from an image captured by the camera, the calibration maker being attached to a robot capable of moving in a view of the camera; calculating, for the observation of the calibration marker, a transform T (camera, marker) between a camera frame of the camera and a marker frame of the calibration marker; obtaining, for the observation of the calibration marker, a transform T (world, robot) between a world frame of the map and a robot frame of the (Continued)

robot; and performing, when more than a predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

17 Claims, 5 Drawing Sheets

(56) References Cited

U.S. PATENT DOCUMENTS

| | | | |
|---|---|---|---|
| 2011/0123135 A1 | 5/2011 | Hsieh et al. | |
| 2016/0012588 A1* | 1/2016 | Taguchi | H04N 13/204 |
| | | | 348/46 |
| 2018/0185100 A1* | 7/2018 | Weinstein | A61B 34/20 |
| 2020/0016757 A1* | 1/2020 | Sakuramoto | B25J 13/08 |
| 2020/0273205 A1* | 8/2020 | Yamashita | H04N 17/002 |
| 2021/0065398 A1* | 3/2021 | Cui | G06T 7/292 |
| 2022/0324117 A1* | 10/2022 | Chen | B25J 9/1671 |
| 2022/0379483 A1* | 12/2022 | Park | B25J 9/1648 |
| 2023/0089195 A1* | 3/2023 | Satoh | B25J 13/089 |
| | | | 700/258 |
| 2024/0118092 A1* | 4/2024 | Kim | G01C 21/32 |

FOREIGN PATENT DOCUMENTS

| | | |
|---|---|---|
| CN | 110969665 A | 4/2020 |
| EP | 3587044 A1 | 1/2020 |
| TW | 201118794 A | 6/2011 |
| TW | 201915792 A | 4/2019 |
| TW | 202019164 A | 5/2020 |
| WO | 2020010628 A1 | 1/2020 |

OTHER PUBLICATIONS

Umeyama, Shinji, "Least-squares estimation of transformation parameters between two point patterns," IEEE Transactions on Pattern Analysis and Machine Intelligence, vol. 13, No. 04, Apr. 1991, pp. 376-380.

Meyer, Jonathan, "Robot Calibration Tools", last updated May 17, 2022, online: https://github.com/Jmeyer1292/robot_cal_tools.

Taiwan search report issued for the corresponding Taiwan patent application No. 110134020, dated Mar. 12, 2025, 1 page (for informational purposes only).

* cited by examiner

```
┌─────────────────────────────────────────────────────────────────────┐    ⎯ 410
│ Obtain an initial estimate of the transform T(world, camera) by a   │
│ trajectory alignment method based on the transform T(world, robot)  │
│ and the transform T(camera, marker) for each observation of the     │
│ calibration marker                                                  │
└─────────────────────────────────────────────────────────────────────┘
                                    ↓
┌─────────────────────────────────────────────────────────────────────┐    ⎯ 420
│ Calculate an initial estimate of a transform T(robot, marker)       │
│ between the robot frame and the marker frame based on the initial   │
│ estimate of the transform T(world, camera), and the transform       │
│ T(world, robot) and the transform T(camera, marker) for any         │
│ observation of the calibration marker                               │
└─────────────────────────────────────────────────────────────────────┘
                                    ↓
┌─────────────────────────────────────────────────────────────────────┐    ⎯ 430
│ Calculate the transform T(world, camera) by use of a hand-eye       │
│ calibration algorithm based on the initial estimate of the          │
│ transform T(world, camera), the initial estimate of the transform   │
│ T(robot, marker), and the transform T(world, robot) and the         │
│ transform T(camera, marker) for each observation of the             │
│ calibration marker                                                  │
└─────────────────────────────────────────────────────────────────────┘
```

CAMERA REGISTRATION VIA ROBOT

CROSS-REFERENCE TO RELATED APPLICATIONS

This is a national phase of PCT Application PCT/CN2020/139588 filed on Dec. 25, 2020, the entire contents of which are incorporated by reference.

TECHNICAL FIELD

Embodiments described herein generally relate to camera calibration, and more particularly relate to methods, apparatuses and systems for registering a camera into a map via a robot.

BACKGROUND

In a smart space with one or more environmental cameras, it may be preferable to register all of the cameras into one map, so that a perception result from each camera can be fused and presented on the map and can be used by various applications such as person tracking, object finding and anomaly detection. In other words, the applications should be aware of positions, orientations, and intrinsic parameters of these cameras in the map.

Camera registration are usually effortful, requiring experienced engineers and a significant cost in deployment and maintenance of the environmental cameras. It is desired to reduce the human labor and the cost for the camera registration.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Various applications such as person tracking, object finding and anomaly detection may be implemented in a smart space deployed with environmental cameras. It may be preferable that all of the environmental cameras can be registered into one map (e.g. a physical world map), so that a perception result from each camera can be fused and presented on the map and can be used by the various applications.

Registering an environmental camera into a physical world map requires to match some positions in an image captured by the camera to corresponding positions in the physical world map. A typical work flow for registering the camera may include the operations of calibrating intrinsic parameters of the camera; getting a precise floorplan of the smart space or generating the floorplan with manual measurements; setting at least four visual markers (e.g. black dots) on a floor of the smart space in a view of the camera; measuring map coordinates of each marker in the physical world map; annotating a position of each marker on the image captured by the camera; and calculating a pose of the camera in the physical world map with a multi-view geometry method.

The operations of the typical work flow for registering the camera may usually require manual efforts from an experienced engineer, which may be quite effortful. For example, it may take two days for the experienced engineer to deploy four cameras in a two-room office area for a demo show on Lenovo Tech World 2020. Thus it may be desirable to reduce the human labor involved in the camera registration and implement the camera registration in a highly automatic way.

Figure 1:
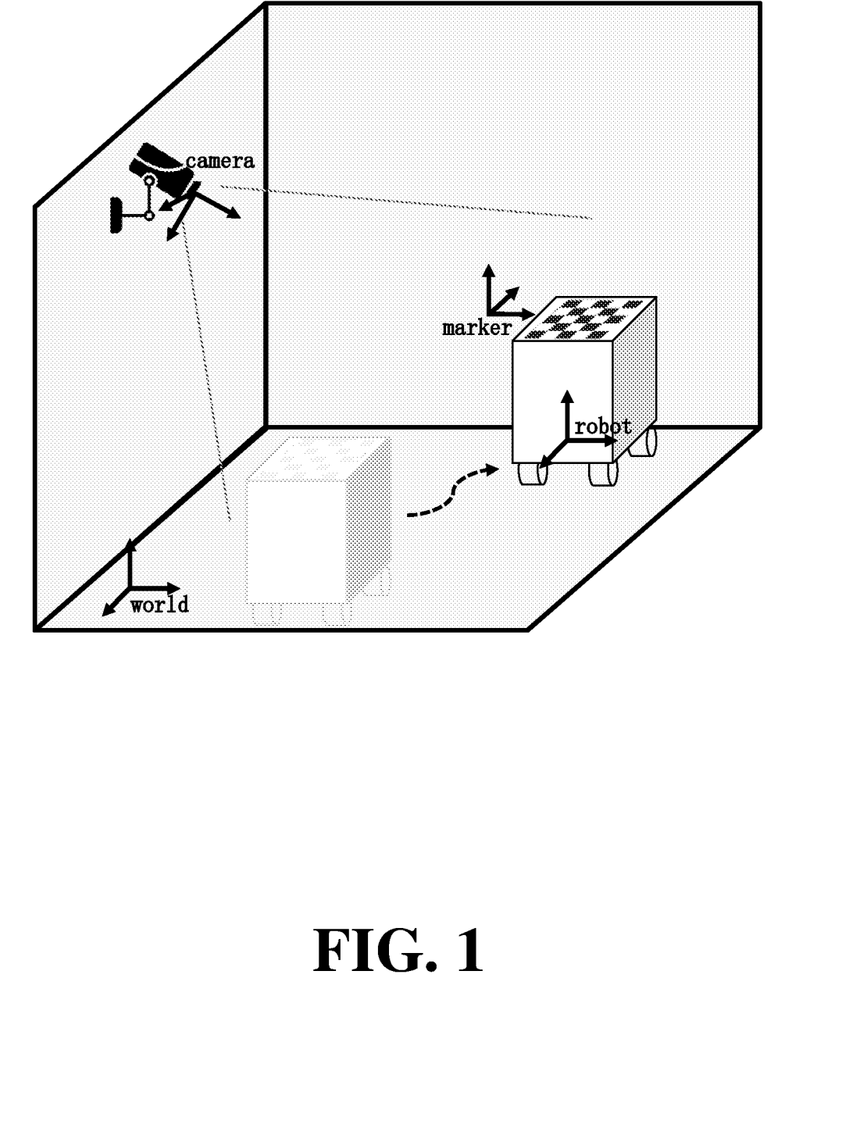
FIG. 1 shows an example scenario of registering a camera into a map via a robot according to some embodiments of the present disclosure.

According to some embodiments of the present disclosure, it is proposed to register an environmental camera into a map via a robot capable of moving in a view of the camera. FIG. 1 shows an example scenario of registering a camera into a map via a robot according to some embodiments of the present disclosure.

As shown in FIG. 1, an environmental camera may be deployed in a smart space and it may be desired to register the camera in a floor map of the smart space. It should be understood that there may be other environmental cameras deployed in the space but not shown in the figure, and the registration process may be the same for each environmental camera. Therefore, the register process will be described with respect to one camera.

Further referring to FIG. 1, a physical calibration board may be arbitrarily attached onto the robot or a virtual calibration board may be shown on a screen of the robot. The robot may move around in the view of the camera so that the calibration board can be seen by the static camera at different positions. In other words, the calibration board may appear in different positions in the image captured by the camera and thus be observed by the camera many times. The observations of the calibration board may be collected by a processor to calculate a pose of the camera in the floor map and thus register the camera into the floor map.

From illustration of FIG. 1, it can be appreciated that the proposed solution for camera registration may require a robot that is capable of moving around in a view of an environmental camera to be registered and a calibration marker (e.g. the calibration board) that is attached to the robot and able to be observed by the camera at different positions. Accordingly, a camera registration system according to some embodiments of the present disclosure may include a camera registration apparatus, a robot capable of moving in the view of the environmental cameras; and a calibration marker attached to the robot. It is noted that the calibration marker may be designed to have any appropriate patterns and may be arbitrarily attached onto the robot at any appropriate positions, which is not limited herein.

Figure 2:
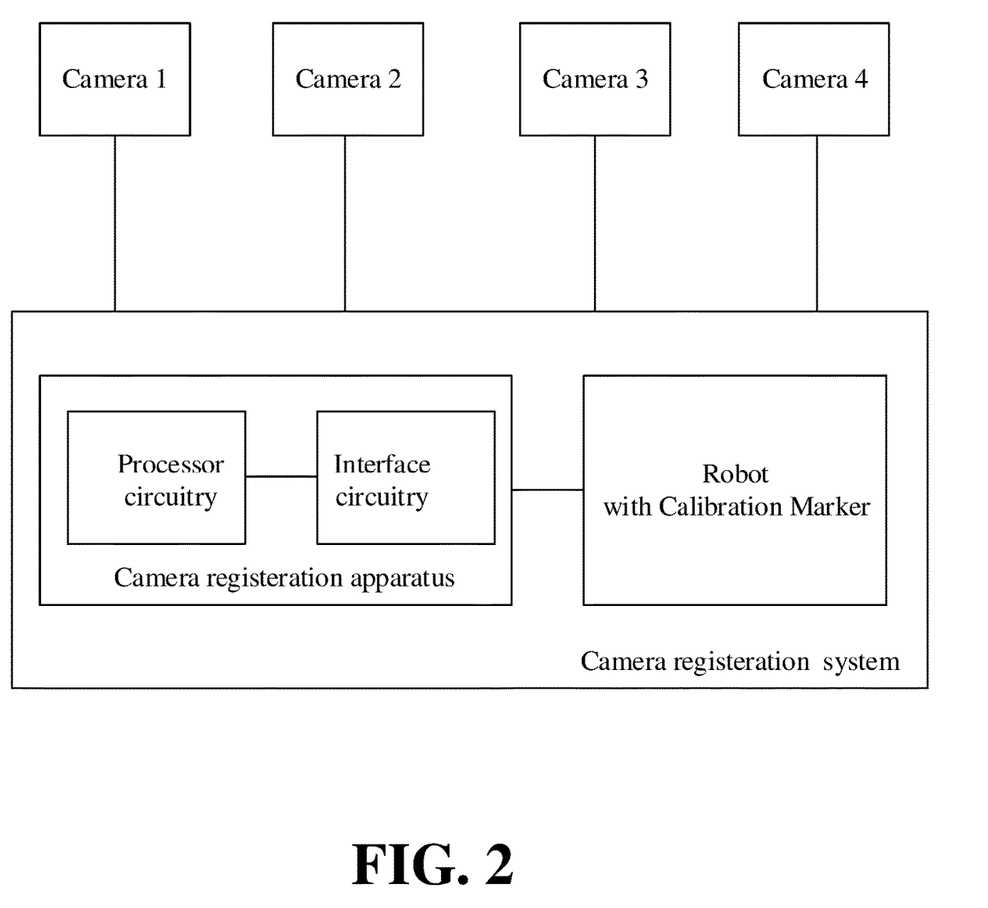
FIG. 2 shows an example system for camera registration via a robot according to some embodiments of the present disclosure.

FIG. 2 shows an example system for camera registration via a robot according to some embodiments of the present disclosure. As shown in FIG. 2, it is assumed that there are four environmental cameras in a smart space that need to be registered into a same map (e.g. a floor map of the smart space). The four cameras may be coupled to a camera registration system including a camera registration apparatus and a robot with a calibration marker. The robot may be capable of moving in a three-dimensional space or a two-dimensional plane in the view of the camera automatically or under human control. The calibration marker may be arbitrarily attached on the robot and keep static relative to the robot during movement of the robot. Alternatively, the calibration marker may be a virtual calibration marker shown on a screen of the robot.

When the robot moves around in the space, the calibration marker may accordingly move around in the view of the cameras and may be captured by the cameras at different positions in the space. For each camera, the images captured by the camera may be transferred to a processor circuitry in the camera registration apparatus, and then the processor circuitry may collect observations of the calibration marker from the images captured by the camera. When the collected observations of the calibration marker are sufficient to perform a calibration process for the camera, the processor circuitry may perform the calibration process based on the collected observations of the calibration marker to determine a pose of the camera in the floor map of the space. The poses of the four cameras can be determined in the same way and then the four cameras can be registered in the floor map of the space.

According to some embodiments of the present disclosure, it is proposed to use a robot with a calibration marker to determine a pose of an environmental camera in a map by use of existing or future-developed hand-eye calibration algorithms.

Referring to FIG. 1 again, there may be four coordinate systems (also referred to as frames herein) to be involved in the registration process for the camera. The four coordinate systems may include a camera frame of the camera which may be an optical frame of the static camera, a marker frame of the calibration marker which may be a moving frame aligning to a position and an orientation of the calibration marker, a robot frame of the robot which may be a moving frame representing a pose of the moving robot, and a world frame of the map which may be a static frame of the floor map on which the robot may move around. Accordingly, the problem of determining the pose of the camera in the floor map may be equivalent to the problem of calculating a transform T (world, camera) between the world frame and the camera frame, which is static.

As described above, the processor circuitry in the camera registration apparatus may collect observations of the calibration marker from the images captured by the camera, and when the collected observations are sufficient to perform the calibration process for the camera, the processor circuitry may perform the calibration process based on the collected observations to determine the pose of the camera.

Specifically, for each observation, the processor circuitry may need to obtain a transform T (camera, marker) between the camera frame and the marker frame as well as a transform T (world, robot) between the world frame and the robot frame. For example, the processor circuitry may calculate the transform T (camera, marker) by use of an existing or future-developed computer vision method for calibration marker detection, and the processor circuitry may obtain the transform T (world, robot) from a Simultaneous Localization and Mapping (SLAM) system (e.g. Laser SLAM or Visual SLAM) of the robot.

In addition, according to some embodiments of the present disclosure, the calibration marker may be allowed to be arbitrarily attached onto the robot, thus a transform T (robot, marker) between the robot frame and the marker frame may be unknown but should be static during the calibration process. Then, the problem of determining the pose of the camera in the map on which the robot moves around may be technically equivalent to a hand-eye calibration problem since the robot moving on the world frame may be viewed as a robotic hand moving on a base of the robotic hand. Thus the algorithms for solving the hand-eye calibration problem may be used herein to determine the pose of the camera and thus register the camera in the map.

Many ready-to-use tools for solving the hand-eye calibration problem, such as the robot calibration tools illustrated in the website https://github.com/Jmeyer1292/robot_cal_tools, may be used in the embodiments of the present disclosure. For example, example codes for a camera-on-wrist calibration algorithm are provided as follows.

```
/***
 * This file contains a standalone example of performing a calibration to understand the transform
 * between a robot wrist and the camera attached to it. It assumes that we have:
 * 1. The camera intrinsics
 * 2. The target size and spacing
 * 3. A bunch of pictures of the target, and
 * 4. The position of the robot wrist (in its base frame) when each of the pictures was taken
 *
 * This is only supposed to be a sample to ease understanding. See the equivalent tool for a
 * configurable offline processor of your data
 */
// This include is used to load images and the associated wrist poses from the data/ directory
// of this package. It's my only concession to the "self-contained rule".
#include <rct_ros_tools/data_set.h>
// This include provide useful print functions for outputting results to terminal
#include <rct_ros_tools/print_utils.h>
```

```cpp
// This header brings in a tool for finding the target in a given image
#include <rct_image_tools/modified_circle_grid_finder.h>
// This header brings in he calibration function for 'moving camera' on robot wrist - what we
// want to calibrate here.
#include <rct_optimizations/extrinsic_hand_eye.h>
// This header brings in the ros::package::getPath() command so I can find the data set
// on your computer.
#include <ros/package.h>
// For std::cout
#include <iostream>
int extrinsic WristCameraCalibration()
{
 // The general goal is to fill out the 'Extrinsic Camera on Wrist' problem definition
 // and then call 'rct_optimizations::optimize()' on it.
 // Step 1: Create a problem definition. It requires we set:
 // - Camera Intrinsics
 // - Guesses for the 'base to target' and 'wrist to camera'
 // - The wrist poses
 // - Correspondences (2D in image to 3D in target) for each wrist pose
 rct_optimizations::ExtrinsicHandEyeProblem2D3D problem_def;
 // Step 1: Define the camera intrinsics - I know mine so I write them here. If you don't know
 // yours, use the opencv calibration tool to figure them out!
 problem_def.intr.fx() = 510.0;
 problem_def.intr.fy() = 510.0;
 problem_def.intr.cx() = 320.2;
 problem_def.intr.cy() = 208.9;
 // Step 2: Let's add the guesses next. See the rct_examples/README.md for a discussion about
 // the reference frames for the camera and target!
 Eigen::Vector3d wrist_to_camera_tx (0.015, 0, 0.15); // Guess for wrist-to-camera
 Eigen::Matrix3d wrist_to_camera_rot;
 wrist_to_camera_rot << 0, 1, 0,
                       -1, 0, 0,
                        0, 0, 1;
 problem_def.camera_mount_to_camera_guess.translation() = wrist_to_camera_tx;
 problem_def.camera_mount_to_camera_guess.linear() = wrist_to_camera_rot;
 Eigen::Vector3d base_to_target_tx (1, 0, 0); // Guess for base-to-target
 Eigen::Matrix3d base_to_target_rot;
 base_to_target_rot << 0, 1, 0,
                      -1, 0, 0,
                       0, 0, 1;
 problem_def.target_mount_to_target_guess.translation() = base_to_target_tx;
 problem_def.target_mount_to_target_guess.linear() = base_to_target_rot;
// Step 3: We need to specify the wrist-poses and the correspondences. I'm going to use a simple // tool I wrote to
load images and wrist poses from a file. You need to implement the data
// collection logic for your application.
// Step 3.1: Load the data set (and make sure it worked)
const std::string data_path = ros::package::getPath("rct_examples") + "/data/test_set_10x10/cal_data.yaml";
boost::optional<rct_ros_tools::ExtrinsicDataSet > maybe_data_set = rct_ros_tools::parseFromFile(data_path);
// Attempt to load the data set via the data record yaml file:
if (!maybe_data_set)
{
 std::cerr < < "Failed to parse data set from path = " < < data_path << "\n";
 return 1;
}
 // Now that its loaded let's create some aliases to make this nicer
 const std::vector<cv::Mat> & image_set = maybe_data_set->images;
 const std::vector <Eigen::Isometry3d> & wrist_poses = maybe_data_set->tool_poses;
 // Step 3.2: We need to conver the images of calibration targets into sets of correspondences.
 // In our case, each dot on the target becomes a correspondence: A pair of positions, one for
 // where the dot was seen in the image (u, v in pixels) and one for where that same dot is in the
 // target (x,y,z in meters). Repeat for each image.
 // The 'rct_image_tools' package provides a class for describing the target (it's 3D points) and
 // a class for finding that target in an image. So let's create a target...
 rct_image_tools::ModifiedCircleGridTarget target(10, 10, 0.0254); // rows, cols, spacing between dots
 // The Observation Finder class uses the target definition to search images
 rct_image_tools::ModifiedCircleGridTargetFinder target_finder(target);
 // Now we'll loop over the images and 1) find the dots, 2) pair them with the target location,
 // and 3) push them into the problem definition.
 // This process of finding the dots can fail, we we make sure they are found before adding the
 // wrist location for that image.
 problem_def.observations.reserve(image_set.size());
 for (std::size_t i = 0; i < image_set.size(); + +i)
```

```
{
// Try to find the circle grid in this image:
rct_image_tools::TargetFeatures target_features;
try
{
  target_features = target_finder.findTargetFeatures(image_set[i]);
}
catch(const std: : exception& ex)
{
  std::cerr < < "Unable to find the circle grid in image: " << i << "V";
  continue;
// We found the target! Let's "zip-up" the correspondence pairs for this image - one for each
// dot. So we create a data structure:
rct_optimizations::Observation2D3D obs;
obs.correspondence_set.reserve(target_features.size());
// Create correspondences given the target and the features in the image
obs.correspondence_set = target.createCorrespondences(target_features);
// Let's add the wrist pose for this image as the "to_camera_mount" transform
// Since the target is not moving relative to the camera, set the "to_target_mount" transform to identity
obs.to_camera_mount = wrist_poses[i];
obs.to_target_mount = Eigen :: Isometry3d::Identity();
// Finally let's add this observation to the problem!
problem_def.observations.push_back(obs);
}
// Step 4: You defined a problem, let the tools solve it! Call 'optimize()'.
rct_optimizations::ExtrinsicHandEyeResult opt_result = rct_optimizations::optimize(problem_def);
// Step 5: Do something with your results. Here I just print the results, but you might want to
// update a data structure, save to a file, push to a mutable joint or mutable state publisher in
// ROS. The options are many, and it's up to you. We just try to help solve the problem.
rct_ros_tools::printOptResults(opt_result.converged, opt_result.initial_cost_per_obs, opt_result.final_cost_per_obs);
rct_ros_tools::printNewLine();
// Note: Convergence and low cost does not mean a good calibration. See the calibration primer
// readme on the main page of this repo.
Eigen::Isometry3d c = opt_result.camera_mount_to_camera;
rct_ros_tools::printTransform(c, "Wrist", "Camera", "WRIST TO CAMERA");
rct_ros_tools::printNewLine();
Eigen::Isometry3d t = opt_result.target_mount_to_target;
rct_ros_tools::printTransform(t, "Base", "Target", "BASE TO TARGET");
rct_ros_tools::printNewLine();
  return 0;
}
#ifndef RCT_ENABLE_TESTING
int main()
{
   return extrinsic WristCameraCalibration();
}
#else
#include <gtest/gtest.h>
TEST(ExtrinsicCamera, ExtrinsicCamera)
{
   EXPECT_EQ(extrinsicWristCameraCalibration(), 0);
}
int main(int argc, char ** argv)
{
   testing::InitGoogleTest( &argc, argv);
   return RUN_ALL_TESTS();
}
#endif
```

These ready-to use tools for solving hand-eye calibration problems may require a good enough initial estimate of the transforms to be solved, otherwise the solver would fail to converge. As described above, in terms of the calibration process for registering the camera into the physical world map, the transforms to be solved may include T (world, camera) and T (robot, marker). The solution would be less practical or not practical at all if we require the user to provide such information, because it is tricky and error-prone to manually estimate a rotation matrix.

According to some embodiments of the present disclosure, it is proposed to use a trajectory alignment method to provide an initial estimate of T (world, camera). In particular, a trajectory that the robot moves relative to the physical world map and a trajectory that the calibration marker moves relative to the camera may be acquired according to the transforms T (world, robot) and the transforms T (camera, marker) obtained for the observations of the calibration marker. The two trajectories may be aligned with a trajectory alignment method so as to obtain an initial estimate of the transform T (world, camera). It should be understood that any existing or future-developed trajectory alignment method may be applied to get the initial estimate of the transform T (world, camera), which is not limited herein. For example, the trajectory alignment method as described in S. Umeyama, "Least-squares estimation of transformation parameters between two point patterns," *IEEE Transactions on Pattern Analysis and Machine Intelligence*, vol. 13, no. 04, pp. 376-380, April 1991, may be used to get the initial estimate of the transform T (world, camera), as the calibration marker and the robot may always have similar positions and the orientations may be irrelevant in the trajectory alignment method. The content of the S. Umeyama's method may be incorporated herein by reference in its entirety.

Then, an initial estimate of T (robot,marker) may be calculated below based on the initial estimate of the transform T (world, camera), and the transform T (world, robot) and the transform T (camera, marker) for any valid observation of the calibration marker.

$$T(\text{robot,marker})=T(\text{robot,world})*T(\text{world,camera})*T(\text{camera,marker}).$$

With the initial estimates of T (world, camera) and T (robot, marker), the accurate transform T (world, camera) may be solved by use of a hand-eye calibration tool based on the collected observations of the calibration marker.

According to some embodiments of the present disclosure, if the robot is only capable of moving in a two-dimensional (2D) plane in the view of the static camera, the height of the static camera may be unobservable. In this case, an extra term may need to be added to a cost function of the hand-eye calibration problem to constraint a z-axis translation of the transform T (robot, marker) to a manually measured height value. In other words, a pre-measured height of the camera may be applied as a constraint value of the z-axis translation of the transform T (robot, marker) when solving the hand-eye calibration problem. Otherwise the covariance matrix for solving the problem would be rank deficient and the problem would have infinitely many optimal solutions (i.e. the solver would fail). The manually measured height value may not need to be accurate because an absolute height of a 2D map of the robot may not be important anyway in such cases.

The camera register process according to some embodiments of the present disclosure will be further described below with reference to the flowcharts of FIG. 3 and FIG. 4.

Figure 3:
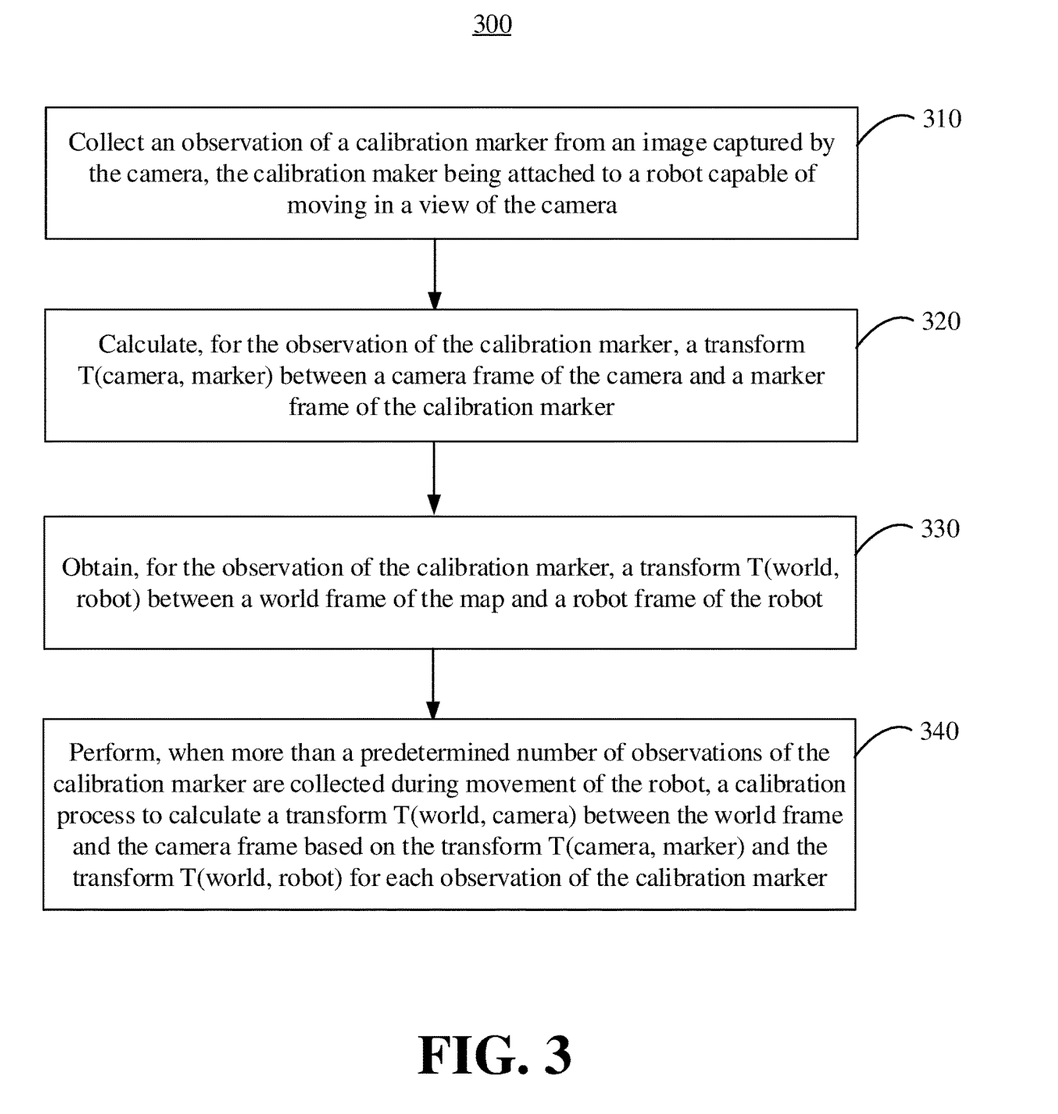
FIG. 3 shows a flowchart illustrating an example method for registering a camera into a map via a robot according to some embodiments of the present disclosure.

FIG. 3 shows a flowchart illustrating an example method 300 for registering a camera into a map via a robot according to some embodiments of the present disclosure. As shown in FIG. 3, the method 300 may include operations 310 to 340 that may be implemented by the camera registration apparatus as shown in FIG. 2.

At operation 310, the camera registration apparatus may collect an observation of a calibration marker from an image captured by the camera. The calibration maker may be attached to a robot capable of moving in a view of the camera. The robot may be capable of moving in a three-dimensional space or a two-dimensional plane in the view of the camera automatically or under human control. The calibration marker may be arbitrarily attached on the robot and keep static relative to the robot during movement of the robot. Alternatively, the calibration marker may be a virtual calibration marker shown on a screen of the robot. During the movement of the robot, the camera registration apparatus may keep collecting observations of the calibration marker from new images captured by the camera.

At operation 320, the camera registration apparatus may calculate, for the observation of the calibration marker, a transform T (camera, marker) between a camera frame of the camera and a marker frame of the calibration marker.

For example, the processor circuitry in the camera registration apparatus may calculate the transform T (camera, marker) by use of an existing or future-developed computer vision method for calibration marker detection.

At operation 330, for the observation of the calibration marker, the camera registration apparatus may obtain a transform T (world, robot) between a world frame of the map and a robot frame of the robot.

For example, the processor circuitry may obtain the transform T (world, robot) from a SLAM system (e.g. Laser SLAM or Visual SLAM) of the robot.

At operation 340, when more than a predetermined number of observations of the calibration marker are collected during movement of the robot, the camera registration apparatus may perform a calibration process to calculate a transform T (world, camera) between the world frame and the camera frame based on the transform T (camera, marker) and the transform T (world, robot) for each observation of the calibration marker.

Figure 4:
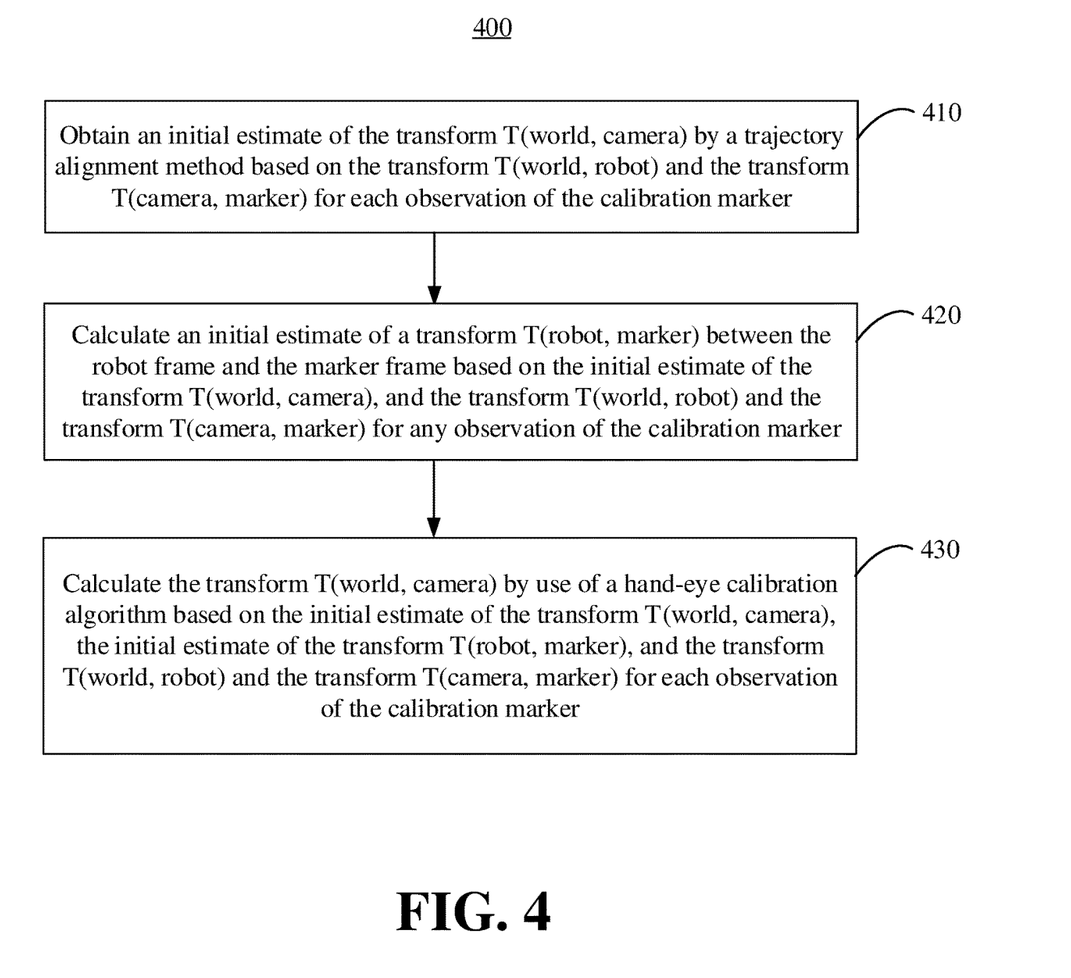
FIG. 4 shows a flowchart illustrating an example calibration process for registering a camera into a map via a robot according to some embodiments of the present disclosure.

FIG. 4 shows a flowchart illustrating an example calibration process 400 for registering a camera into a map via a robot according to some embodiments of the present disclosure.

As shown in FIG. 4, the calibration process 400 may include operations 410 to 430 that may be implemented by the camera registration apparatus as shown in FIG. 2.

At operation 410, the camera registration apparatus may obtain an initial estimate of the transform T (world, camera) by a trajectory alignment method based on the transform T (world, robot) and the transform T (camera, marker) for each observation of the calibration marker.

At operation 420, the camera registration apparatus may calculate an initial estimate of a transform T (robot, marker) between the robot frame and the marker frame based on the initial estimate of the transform T (world, camera), and the transform T (world, robot) and the transform T (camera, marker) for any observation of the calibration marker.

At operation 430, the camera registration apparatus may calculate the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

When the transform T (world, camera) is successfully obtained via the calibration process, the camera may be registered into the map based on the transform T (world, camera). In addition, the camera may be registered into a same coordinate system with the robot based on the transform T (world, camera) and the transform T (world, robot).

In some embodiments of the present disclosure, under a condition that the robot is only capable of moving in a two-dimensional plane in the view of the camera, a pre-measured height of the camera may be applied as a constraint value of a z-axis translation of the transform T (robot, marker) for the calibration process.

In some embodiments of the present disclosure, an observation of the calibration marker may be collected when the calibration marker is detected from the image captured by the camera and keeps static in the image for a predetermined duration. In addition, when a new observation of the calibration marker is collected in addition to the predetermined number of observations of the calibration marker, the camera registration apparatus may invoke the calibration process to re-calculate the transform T (world, camera).

The proposed method as shown in FIG. 3 and FIG. 4 may be implemented as a Robot Operating System (ROS) package in some embodiments of the present disclosure. In the embodiments, the camera registration system may collect an observation of the calibration marker when the calibration marker is detected from an image captured by the camera and keeps stable for 1 second, so as to avoid errors caused by imperfect synchronization between the marker detection and the SLAM system. When a predetermined number (e.g. five) of observations are collected, the calibration process may be invoked to calculate the transform T (world, camera). Furthermore, each new observation in addition to the predetermined number of observations may trigger the calibration process to re-calculate the transform T (world, camera).

According to some embodiments of the present disclosure, the proposed camera calibration process may be applied for existing applications that need camera calibration against the scene. Doing the camera calibration automatically will save time and money for customers as manual calibration is error-prone and difficult. For new applications, customers may build and deploy Artificial Intelligence (AI) network on top of existing infrastructure, e.g. extending robotics sensing to include surveillance cameras in the scene. Furthermore, by use of the proposed camera registration system, future multimodal scene analytics may ingest data from fixed and mobile sensors in the scene to build the scene graph. The proposed camera registration system may provide the foundation for using all cameras in the scene to build and update the scene graph in time to enable a vast array of future applications.

Figure 5:
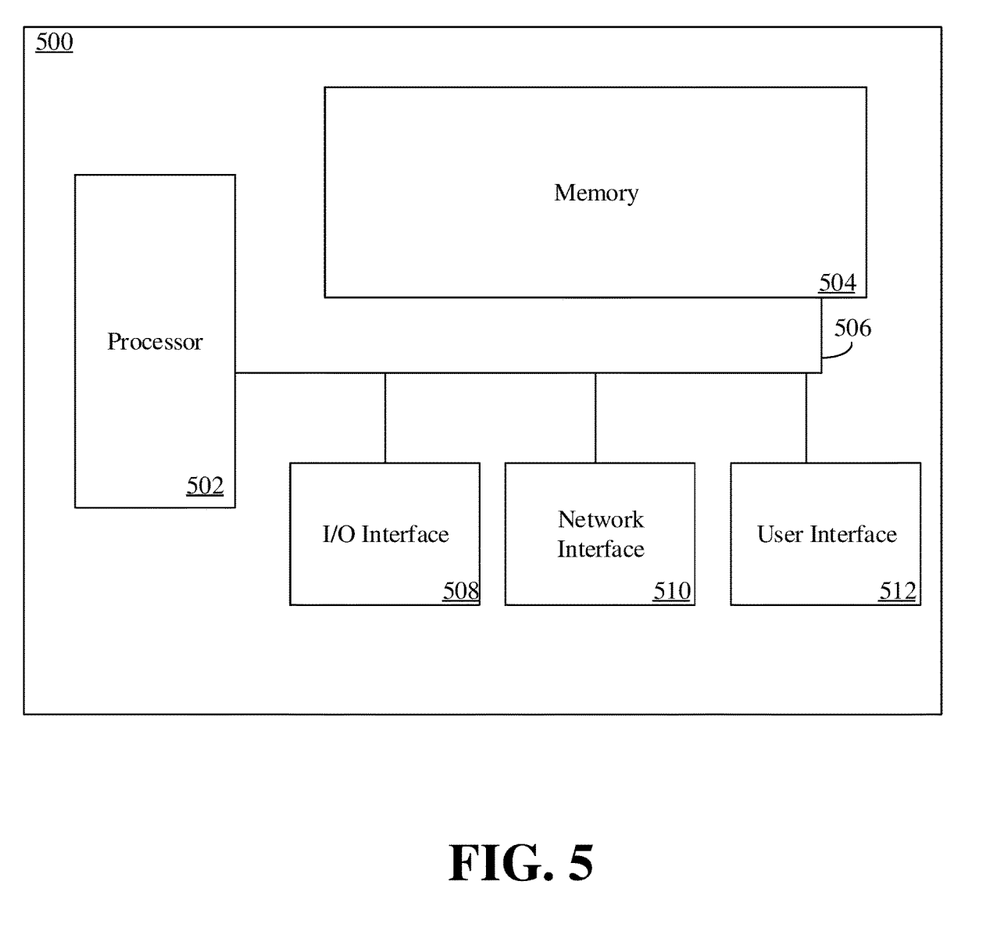
FIG. 5 shows a block diagram of an example computing system that can implement a method for registering a camera into a map via a robot according to some embodiments of the present disclosure.

FIG. 5 illustrates an exemplary computing system 500 that can implement a method for registering a camera into a map via a robot according to some embodiments of the present disclosure. The computing system 500 may include a processor 502 in communication with a memory 504. The memory 504 can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The computing system 500 may additionally include a local communication interface 506 for connectivity between the various components of the system. For example, the local communication interface 506 may be a local data bus and/or any related address or control busses as may be desired.

The computing system or device 500 may also include an I/O (input/output) interface 508 for controlling the I/O functions of the system, as well as for I/O connectivity to devices outside of the computing system 500. A network interface 510 may also be included for network connectivity. The network interface 510 may control network communications both within the system and outside of the system. The network interface may include a wired interface, a wireless interface, a Bluetooth interface, optical interface, and the like, including appropriate combinations thereof. Furthermore, the computing system 500 may additionally include a user interface 512 as well as various other components that would be beneficial for such a system.

The processor 502 may be a single processor or multiple processors, and the memory 504 may be a single memory or multiple memories. The local communication interface 506 may be used as a pathway to facilitate communication between any of a single processor, multiple processors, a single memory, multiple memories, the various interfaces, and the like, in any useful combination.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium, wherein, when the program code is loaded into and executed by a machine, such as a computer, the machine becomes an apparatus for practicing the various techniques. The non-transitory computer readable storage medium may be a computer readable storage medium that does not include signal. In the case of program code execution on programmable computers, the computing system may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Exemplary systems or devices may include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

ADDITIONAL NOTES AND EXAMPLES

Example 1 includes a method for registering a camera into a map, comprising: collecting an observation of a calibration marker from an image captured by the camera, the calibration maker being attached to a robot capable of moving in a view of the camera; calculating, for the observation of the calibration marker, a transform T (camera, marker) between a camera frame of the camera and a marker frame of the calibration marker; obtaining, for the observation of the calibration marker, a transform T (world, robot) between a world frame of the map and a robot frame of the robot; and performing, when more than a predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

Example 2 includes the method of Example 1, wherein the calibration process comprises: obtaining an initial estimate of the transform T (world, camera) by a trajectory alignment method based on the transform T (world, robot) and the transform T (camera, marker) for each observation of the calibration marker; calculating an initial estimate of a transform T (robot, marker) between the robot frame and the marker frame based on the initial estimate of the transform T (world, camera), and the transform T (world, robot) and the transform T (camera, marker) for any observation of the calibration marker; and calculating the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

Example 3 includes the method of Example 1 or 2, wherein obtaining the transform T (world, robot) comprises obtaining the transform T (world, robot) from a Simultaneous Localization and Mapping (SLAM) system of the robot.

Example 4 includes the method of Example 2, wherein under a condition that the robot is only capable of moving in a two-dimensional plane in the view of the camera, performing the calibration process further comprises: applying a pre-measured height of the camera as a constraint value of a z-axis translation of the transform T (robot, marker) for the calibration process.

Example 5 includes the method of any of Examples 1 to 4, wherein collecting the observation of the calibration marker comprises collecting the observation of the calibration marker when the calibration marker is detected from the image captured by the camera and keeps stable in the image for a predetermined duration.

Example 6 includes the method of any of Examples 1 to 5, further comprising: invoking the calibration process to re-calculate the transform T (world, camera) when a new observation of the calibration marker is collected in addition to the predetermined number of observations of the calibration marker.

Example 7 includes the method of any of Examples 1 to 6, further comprising: registering the camera into a same coordinate system with the robot based on the transform T (world, camera) and the transform T (world, robot).

Example 8 includes an apparatus for registering a camera into a map, comprising: interface circuitry coupled to the camera and a robot capable of moving in a view of the camera; and processor circuitry coupled to the interface circuitry and configured to: collect an observation of a calibration marker attached to the robot from an image captured by the camera; calculate, for the observation of the calibration marker, a transform T (camera, marker) between a camera frame of the camera and a marker frame of the calibration marker; obtain, for the observation of the calibration marker, a transform T (world, robot) between a world frame of the map and a robot frame of the robot; and perform, when more than a predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

Example 9 includes the apparatus of Example 8, wherein the processor circuitry is configured to perform the calibration process by: obtaining an initial estimate of the transform T (world, camera) by a trajectory alignment method based on the transform T (world, robot) and the transform T (camera, marker) for each observation of the calibration marker; calculating an initial estimate of a transform T (robot, marker) between the robot frame and the marker frame based on the initial estimate of the transform T (world, camera), and the transform T (world, robot) and the transform T (camera, marker) for any observation of the calibration marker; and calculating the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

Example 10 includes the apparatus of Example 8 or 9, wherein the processor circuitry is configured to obtain the transform T (world, robot) from a Simultaneous Localization and Mapping (SLAM) system of the robot via the interface circuitry.

Example 11 includes the apparatus of Example 9, wherein under a condition that the robot is only capable of moving in a two-dimensional plane in the view of the camera, the processor circuitry is configured to perform the calibration process further by: applying a pre-measured height of the camera as a constraint value of a z-axis translation of the transform T (robot, marker) for the calibration process.

Example 12 includes the apparatus of any of Examples 8 to 11, wherein the processor circuitry is configured to collect the observation of the calibration marker when the calibration marker is detected from the image captured by the camera and keeps stable in the image for a predetermined duration.

Example 13 includes the apparatus of any of Examples 8 to 12, wherein the processor circuitry is further configured to: invoke the calibration process to re-calculate the transform T (world, camera) when a new observation of the calibration marker is collected in addition to the predetermined number of observations of the calibration marker.

Example 14 includes the apparatus of any of Examples 8 to 13, wherein the processor circuitry is further configured to: register the camera into a same coordinate system with the robot based on the transform T (world, camera) and the transform T (world, robot).

Example 15 includes a system for registering a camera into a map, comprising: a robot capable of moving in a view of the camera; a calibration marker attached to the robot; and the apparatus for registering the camera into the map according to any of Examples 8 to 14.

Example 16 includes the system of Example 15, wherein the robot is capable of moving in a three-dimensional space in the view of the camera.

Example 17 includes the system of Example 15, wherein the robot is capable of moving in a two-dimensional plane in the view of the camera, and the processor circuitry is configured to perform the calibration process further by applying a pre-measured height of the camera as a constraint value of a z-axis translation of the transform T (robot, marker) for the calibration process.

Example 18 includes the system of any of Examples 15 to 17, wherein the calibration marker is arbitrarily attached on the robot and keeps static relative to the robot during the movement of the robot.

Example 19 includes the system of any of Examples 15 to 17, wherein the calibration marker is a virtual calibration marker shown on a screen of the robot.

Example 20 includes a computer-readable medium having instructions stored thereon, wherein the instructions, when executed by processor circuitry, cause the processor circuitry to: collect an observation of a calibration marker attached to the robot from an image captured by the camera; calculate, for the observation of the calibration marker, a transform T (camera, marker) between a camera frame of the camera and a marker frame of the calibration marker; obtain, for the observation of the calibration marker, a transform T (world, robot) between a world frame of the map and a robot frame of the robot; and perform, when more than a predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

Example 21 includes the computer-readable medium of Example 20, wherein the instructions, when executed by the processor circuitry, cause the processor circuitry to perform the calibration process by: obtaining an initial estimate of the transform T (world, camera) by a trajectory alignment method based on the transform T (world, robot) and the transform T (camera, marker) for each observation of the calibration marker; calculating an initial estimate of a transform T (robot, marker) between the robot frame and the marker frame based on the initial estimate of the transform T (world, camera), and the transform T (world, robot) and the transform T (camera, marker) for any observation of the calibration marker; and calculating the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

Example 22 includes the computer-readable medium of Example 20 or 21, wherein the instructions, when executed by the processor circuitry, cause the processor circuitry to obtain the transform T (world, robot) from a Simultaneous Localization and Mapping (SLAM) system of the robot.

Example 23 includes the computer-readable medium of Example 21, wherein under a condition that the robot is only capable of moving in a two-dimensional plane in the view of the camera, the instructions, when executed by the processor circuitry, cause the processor circuitry to perform the calibration process further by: applying a pre-measured height of the camera as a constraint value of a z-axis translation of the transform T (robot, marker) for the calibration process.

Example 24 includes the computer-readable medium of any of Examples 20 to 23, wherein the instructions, when executed by the processor circuitry, cause the processor circuitry to collect the observation of the calibration marker when the calibration marker is detected from the image captured by the camera and keeps stable in the image for a predetermined duration.

Example 25 includes the computer-readable medium of any of Examples 20 to 24, wherein the instructions, when executed by the processor circuitry, cause the processor circuitry further to: invoke the calibration process to re-calculate the transform T (world, camera) when a new observation of the calibration marker is collected in addition to the predetermined number of observations of the calibration marker.

Example 26 includes the computer-readable medium of any of Examples 20 to 25, wherein the instructions, when executed by the processor circuitry, cause the processor circuitry further to: register the camera into a same coordinate system with the robot based on the transform T (world, camera) and the transform T (world, robot).

Example 27 includes an apparatus for registering a camera into a map, comprising: means for collecting an observation of a calibration marker from an image captured by the camera, the calibration maker being attached to a robot capable of moving in a view of the camera; means for calculating, for the observation of the calibration marker, a transform T (camera, marker) between a camera frame of the camera and a marker frame of the calibration marker; means for obtaining, for the observation of the calibration marker, a transform T (world, robot) between a world frame of the map and a robot frame of the robot; and means for performing, when more than a predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

Example 28 includes the apparatus of Example 27, wherein the means for performing the calibration process comprises: means for obtaining an initial estimate of the transform T (world, camera) by a trajectory alignment method based on the transform T (world, robot) and the transform T (camera, marker) for each observation of the calibration marker; means for calculating an initial estimate of a transform T (robot, marker) between the robot frame and the marker frame based on the initial estimate of the transform T (world, camera), and the transform T (world, robot) and the transform T (camera, marker) for any observation of the calibration marker; and means for calculating the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

Example 29 includes the apparatus of Example 27 or 28, wherein the means for obtaining the transform T (world, robot) comprises means for obtaining the transform T (world, robot) from a Simultaneous Localization and Mapping (SLAM) system of the robot.

Example 30 includes the apparatus of Example 28, wherein under a condition that the robot is only capable of moving in a two-dimensional plane in the view of the camera, the means for performing the calibration process further comprises: means for applying a pre-measured height of the camera as a constraint value of a z-axis translation of the transform T (robot, marker) for the calibration process.

Example 31 includes the apparatus of any of Examples 27 to 30, wherein the means for collecting the observation of the calibration marker comprises means for collecting the observation of the calibration marker when the calibration marker is detected from the image captured by the camera and keeps stable in the image for a predetermined duration.

Example 32 includes the apparatus of any of Examples 27 to 31, further comprising: means for invoking the calibration process to re-calculate the transform T (world, camera) when a new observation of the calibration marker is collected in addition to the predetermined number of observations of the calibration marker.

Example 33 includes the apparatus of any of Examples 27 to 32, further comprises: means for registering the camera into a same coordinate system with the robot based on the transform T (world, camera) and the transform T (world, robot).

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for registering a camera into a map, comprising:
   causing a robot to automatically move in a space to a predetermined number of different positions corresponding to a predetermined number of observations;
   collecting an observation of a calibration marker from an image captured by the camera, the calibration maker being attached to the robot, wherein the robot is capable of moving in a view of the camera, the observation being collected when the calibration marker is detected from the image captured by the camera and keeps stable in the image for a predetermined duration;
   calculating, for the observation of the calibration marker, a transform T (camera, marker) between a camera frame of the camera and a marker frame of the calibration marker;
   obtaining, for the observation of the calibration marker, a transform T (world, robot) between a world frame of the map and a robot frame of the robot; and
   performing, when more than the predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

2. The method of claim 1, wherein the calibration process comprises:
   obtaining an initial estimate of the transform T (world, camera) by a trajectory alignment method based on the transform T (world, robot) and the transform T (camera, marker) for each observation of the calibration marker;
   calculating an initial estimate of a transform T (robot, marker) between the robot frame and the marker frame based on the initial estimate of the transform T (world, camera), and the transform T (world, robot) and the transform T (camera, marker) for any observation of the calibration marker; and
   calculating the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

3. The method of claim 1, wherein obtaining the transform T (world, robot) comprises obtaining the transform T (world, robot) from a Simultaneous Localization and Mapping (SLAM) system of the robot.

4. The method of claim 2, wherein under a condition that the robot is only capable of moving in a two-dimensional plane in the view of the camera, performing the calibration process further comprises:
   applying a pre-measured height of the camera as a constraint value of a z-axis translation of the transform T (robot, marker) for the calibration process.

5. The method of claim 1, further comprising:
   invoking the calibration process to re-calculate the transform T (world, camera) when a new observation of the calibration marker is collected in addition to the predetermined number of observations of the calibration marker.

6. The method of claim 1, further comprising:
   registering the camera into a same coordinate system with the robot based on the transform T (world, camera) and the transform T (world, robot).

7. An apparatus for registering a camera into a map, comprising:
   interface circuitry coupled to the camera and a robot capable of moving in a view of the camera; and
   processor circuitry coupled to the interface circuitry and configured to:
   cause the robot to automatically move in a space to a predetermined number of different positions corresponding to a predetermined number of observations;
   collect an observation of a calibration marker attached to the robot from an image captured by the camera when the calibration marker is detected from the image captured by the camera and keeps stable in the image for a predetermined duration;
   calculate, for the observation of the calibration marker, a transform T (camera, marker) between a camera frame of the camera and a marker frame of the calibration marker;
   obtain, for the observation of the calibration marker, a transform T (world, robot) between a world frame of the map and a robot frame of the robot; and
   perform, when more than a predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

8. The apparatus of claim 7, wherein the processor circuitry is configured to perform the calibration process by:
obtaining an initial estimate of the transform T (world, camera) by a trajectory alignment method based on the transform T (world, robot) and the transform T (camera, marker) for each observation of the calibration marker;
calculating an initial estimate of a transform T (robot, marker) between the robot frame and the marker frame based on the initial estimate of the transform T (world, camera), and the transform T (world, robot) and the transform T (camera, marker) for any observation of the calibration marker; and
calculating the transform T (world, camera) by use of a hand-eye calibration algorithm based on the initial estimate of the transform T (world, camera), the initial estimate of the transform T (robot, marker), and the transform T (world, robot) and the transform T (camera, marker) for each observation of the calibration marker.

9. The apparatus of claim 7, wherein the processor circuitry is configured to obtain the transform T (world, robot) from a Simultaneous Localization and Mapping (SLAM) system of the robot via the interface circuitry.

10. The apparatus of claim 8, wherein under a condition that the robot is only capable of moving in a two-dimensional plane in the view of the camera, the processor circuitry is configured to perform the calibration process further by:
applying a pre-measured height of the camera as a constraint value of a z-axis translation of the transform T (robot, marker) for the calibration process.

11. The apparatus of claim 7, wherein the processor circuitry is further configured to:
invoke the calibration process to re-calculate the transform T (world, camera) when a new observation of the calibration marker is collected in addition to the predetermined number of observations of the calibration marker.

12. The apparatus of claim 7, wherein the processor circuitry is further configured to:
register the camera into a same coordinate system with the robot based on the transform T (world, camera) and the transform T (world, robot).

13. A system for registering a camera into a map, comprising:
a robot capable of moving in a view of the camera;
a calibration marker attached to the robot; and
an apparatus for registering a camera into a map, comprising: interface circuitry coupled to the camera and a robot capable of moving in a view of the camera; and processor circuitry coupled to the interface circuitry and configured to:
cause a robot to automatically move in a space to a predetermined number of different positions corresponding to a predetermined number of observations
collect an observation of a calibration marker attached to the robot from an image captured by the camera when the calibration marker is detected from the image captured by the camera and keeps stable in the image for a predetermined duration;
calculate, for the observation of the calibration marker, a transform T (camera, marker) between a camera frame of the camera and a marker frame of the calibration marker;
obtain, for the observation of the calibration marker, a transform T (world, robot) between a world frame of the map and a robot frame of the robot; and
perform, when more than the predetermined number of observations of the calibration marker are collected during movement of the robot, a calibration process to calculate a transform T (world, camera) between the world frame and the camera frame based on the transform T (camera, marker) and the transform T (world, robot) for each observation of the calibration marker.

14. The system of claim 13, wherein the robot is capable of moving in a three-dimensional space in the view of the camera.

15. The system of claim 13, wherein the robot is capable of moving in a two-dimensional plane in the view of the camera, and the processor circuitry is configured to perform the calibration process further by applying a pre-measured height of the camera as a constraint value of a z-axis translation of the transform T (robot, marker) for the calibration process.

16. The system of claim 13, wherein the calibration marker is arbitrarily attached on the robot and keeps static relative to the robot during the movement of the robot.

17. The system of claim 13, wherein the calibration marker is a virtual calibration marker shown on a screen of the robot.

* * * * *